(12) United States Patent
Masters et al.

(10) Patent No.: US 7,013,434 B2
(45) Date of Patent: Mar. 14, 2006

(54) REMOTE CONTROL WITH LOCAL, SCREEN-GUIDED SETUP

(75) Inventors: Michael D. Masters, Anaheim, CA (US); Alex Louie, Los Angeles, CA (US); Lily Tsong-Chou Knowles, Irvine, CA (US); Stephen Brian Gates, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 218 days.

(21) Appl. No.: 10/410,103

(22) Filed: Apr. 9, 2003

(65) Prior Publication Data

US 2005/0216843 A1 Sep. 29, 2005

Related U.S. Application Data

(60) Provisional application No. 60/437,888, filed on Jan. 3, 2003.

(51) Int. Cl.
*G06F 13/00* (2006.01)

(52) U.S. Cl. .......................... 715/840; 386/46

(58) Field of Classification Search ................ 715/728, 715/737, 716, 718, 763, 765, 740, 744, 764, 715/840, 773, 846; 386/4, 46, 125
See application file for complete search history.

(56) References Cited

U.S. PATENT DOCUMENTS

| | | | |
|---|---|---|---|
| 4,746,919 A | 5/1988 | Reitmeier | |
| 5,204,768 A | 4/1993 | Tsakiris et al. | |
| 5,410,326 A | 4/1995 | Goldstein | |
| 6,008,735 A | 12/1999 | Chiloyan et al. | |
| 6,083,270 A | 7/2000 | Scott | |
| 6,111,569 A | 8/2000 | Brusky et al. | |
| 6,124,804 A | 9/2000 | Kitao et al. | |
| 6,289,165 B1 * | 9/2001 | Abecassis | 386/46 |
| 6,340,868 B1 | 1/2002 | Lys et al. | |
| 6,344,817 B1 | 2/2002 | Verzulli | |
| 6,459,919 B1 | 10/2002 | Lys et al. | |
| 6,507,306 B1 * | 1/2003 | Griesau et al. | 341/176 |

OTHER PUBLICATIONS

Universal Electronics Inc., One For All, URC 8080 A/V Producer, User Manual, Feb. 1998, 23 pages.

* cited by examiner

*Primary Examiner*—Cao (Kevin) Nguyen
(74) *Attorney, Agent, or Firm*—Gary R. Jarosik

(57) ABSTRACT

A system and method for setting up a user interface of a remote control. The remote control displays a logical group of function keys the activation of which will cause the remote control to transmit a command to a target device and a plurality of indicators representative of devices. A user input functions to select one of the plurality of indicators and the device represented by the selected indicator is assigned as the target device for the logical group of function keys.

28 Claims, 18 Drawing Sheets

REMOTE CONTROL WITH LOCAL, SCREEN-GUIDED SETUP

RELATED APPLICATION

This application claims the benefit of U.S. Provisional application Ser. No. 60/437,888, filed on Jan. 3, 2003, entitled "Remote Control With Local Screen-Guided Setup."

BACKGROUND OF THE INVENTION

This invention relates generally to electronic devices and, more particularly, relates to a remote control having a local, screen-guided setup process.

Remote controls including universal remote controls for controlling the operation of home appliances are well known. In this regard, a universal remote control functions by consolidating three, four, five, and more remote controls into one device. However, as more remotely controllable appliances enter the homes of consumers and the number of remotely controllable operations increase, the user interface of the universal remote control becomes increasingly more complex. This complexity arises from the need to provide more and more keys which are used to initiate the transmission of the control codes that control the increasing number of operations of the increasing number of home appliances. Disadvantageously, as the user interface of the universal remote control becomes more cluttered, the usability of the universal remote control diminishes. Accordingly, a need exists for a universal remote control having an improved user interface that simplifies the operation of the universal remote control and, as such, the remote operation of consumer appliances. A need also exists for an improved method for setting-up such a user interface.

SUMMARY OF THE INVENTION

In accordance with these and other needs, a remote control having a local, screen-guided setup procedure is provided. In particular, the local, screen-guided setup procedure may be used to setup a remote control to present an interface for controlling the operation of multiple home appliances, for example, in a home theater system. Instructions or programming for implementing the local, screen-guided setup may be embodied on a readable medium, such as a memory chip, CD or DVD rom, smart card, or the like. Advantages, features, properties and relationships of local, screen-guided setup procedures will be obtained from the following detailed description and accompanying drawings which set forth illustrative embodiments which are indicative of the various ways in which the principles described hereinafter may be employed.

BRIEF DESCRIPTION OF THE DRAWINGS

For a better understanding of the remote control with local, screen-guided setup, reference may be had to preferred embodiments shown in the following drawings in which.

DETAILED DESCRIPTION

Increasingly, universal remote controls include a "home theater" mode activated, for example, by a special device selection key. When the home theater mode is activated, rather than placing the remote control into a mode for controlling the operation of a specific device (e.g., TV, DVD, etc.), which normally occurs when other device selection keys are activated, a special home theater page is invoked in which function keys of the graphical user interface of the remote control perform as a composite to facilitate control of several devices. It will be appreciated that activation of a function key typically results in the remote control transmitting a command to an intended target device. By way of example, within the home theater page the volume keys may be used to command volume operations of an audio amplifier, the transport keys may be used to command transport operations of a DVD player, and the channel selection keys may be used to command channel operations of a satellite receiver, etc. While the home theater mode of operation enhances the home theater viewing experience, it usually requires a lengthy initial setup process, since the user must specify which device is to be assigned (as the intended target) to each group of function keys.

Figure 1:
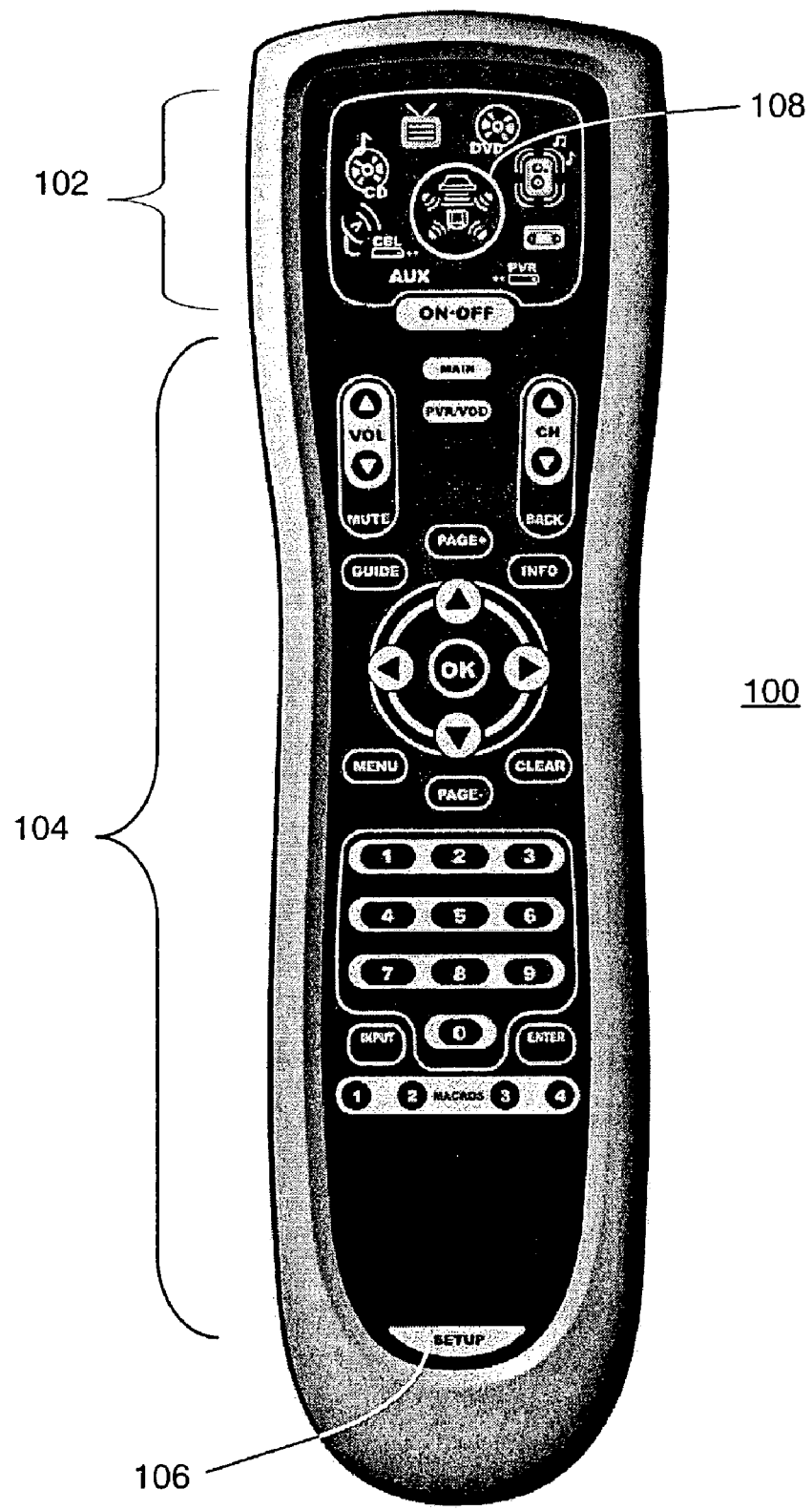
FIG. 1 illustrates an exemplary remote control having an electroluminescent ("EL") panel display.

To simply the initial setup of a home theater page of a remote control, selective key illumination capabilities may be utilized. By way of example, FIG. 1 illustrates an exemplary universal remote control 100 having such selective key illumination capabilities. In general, the face of the remote control 100 includes an area 102 for selection of the device to be controlled, a second area 104 depicting device functions that may be controlled, and a key 106 to initiate setup of the unit—e.g., to select a brand and model of the devices to be controlled as well as other customizations.

Figure 2:
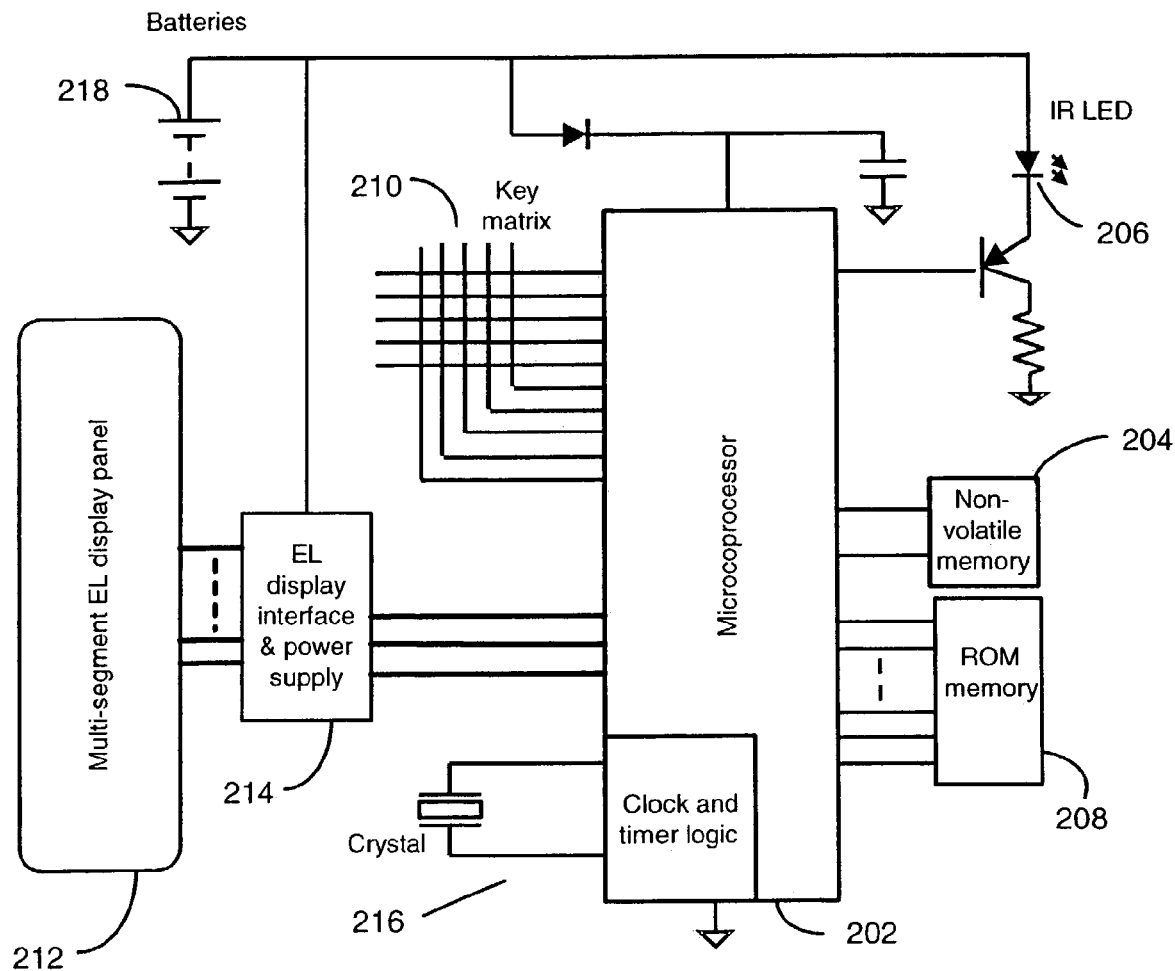
FIG. 2 illustrates a schematic diagram of the remote control of FIG. 1.
Figure 3:
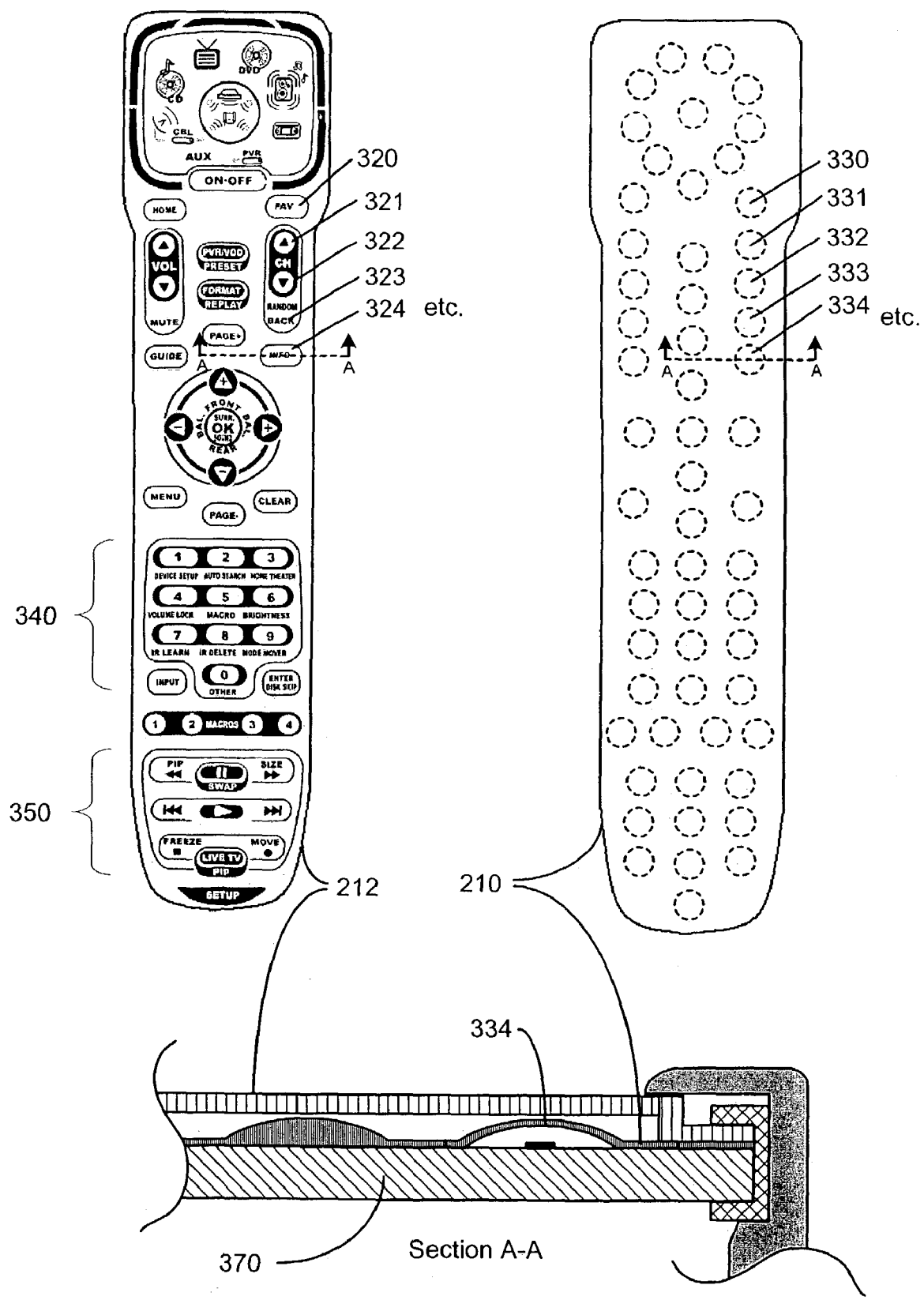
FIG. 3 illustrates a cross-sectional view of the remote control of FIG. 1.

Unlike conventional remote controls which are usually constructed using silicon rubber keypads protruding through cut-outs in a hard plastic upper housing, the remote control 100 uses a flexible, segmented electroluminescent ("EL") panel 212 that is overlaid over a dome switch style key matrix 210. This is illustrated electrically in FIG. 2 and mechanically in FIG. 3. Referring to FIG. 3, it will thus be appreciated that pressure applied to, for example, any of the graphical user interface icons 320 . . . 324, etc., will result in the corresponding dome switch 330 . . . 334, etc. making contact with the underlying printed circuit board 370 to complete a circuit, whereby individual remote control functions are selected by the user. Furthermore, in this exemplary remote control 100, the EL panel 212 may be constructed as described in pending PCT patent application WO 00/72638, which is assigned to Cambridge Consultants Ltd. and which is incorporated herein by reference in its entirety, to allow various parts of the display to be independently illuminated under control of the microprocessor 202 and EL display interface 214, illustrated in FIG. 2. The advantage of such a construction is that different elements may be illuminated at different times, depending on the activity currently being performed by the user.

Figure 4:
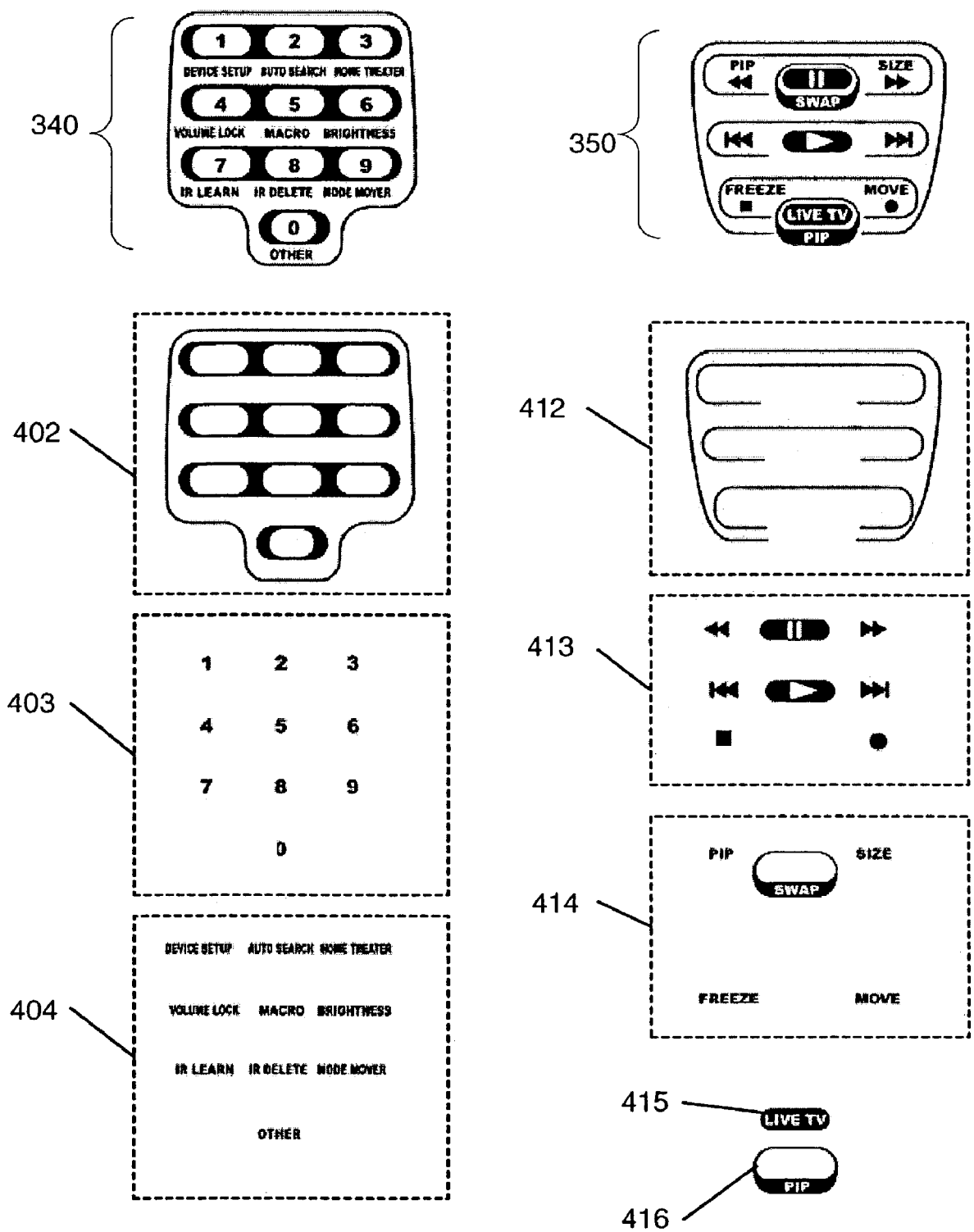
FIGS. 4–7 illustrates exemplary display segments of the remote control of FIG. 1.
Figure 6:
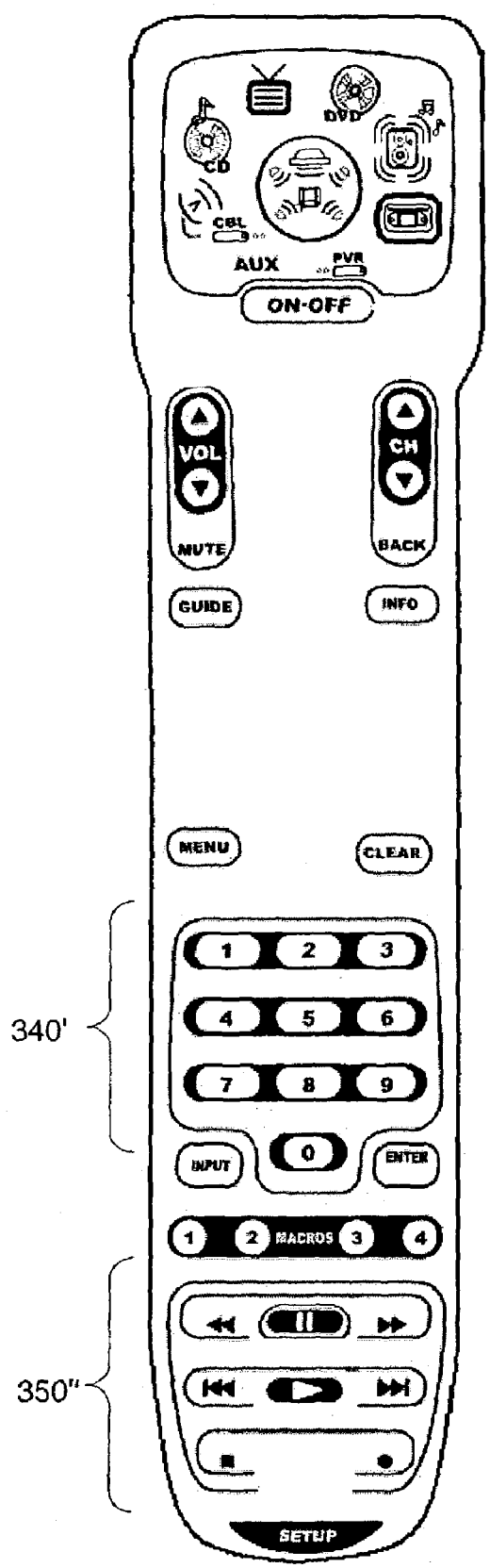
Figure 7:
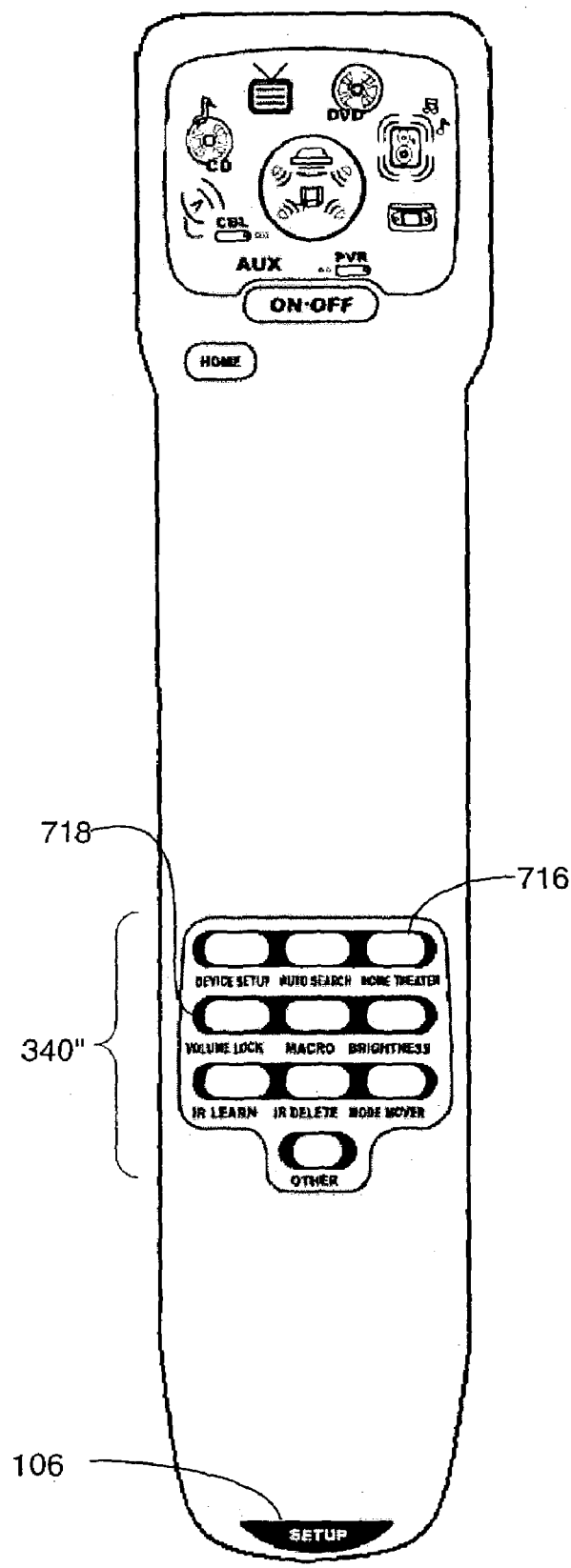

By way of a more detailed example, the numeric keypad portion 340 of the EL panel may be arranged as three separately controllable segments 402, 403, and 404, as illustrated in FIG. 4. To achieve the numeric pad appearance 340', shown for example in FIG. 6, segments 402 and 403 are illuminated by the microprocessor. Similarly, to achieve the appearance 340", shown for example in FIG. 7, segments 402 and 404 are illuminated. A function key area, e.g., the transport key/picture-in-picture control area 350, may also be arranged into segments 412, 413, 414, 415, and 416. In order to achieve the appearance 350', shown for example in FIG. 5c, segments 412, 414, and 416 are illuminated. To achieve the appearance 350", shown for example in FIG. 6, only segments 412 and 413 are illuminated.

Figure 5A:
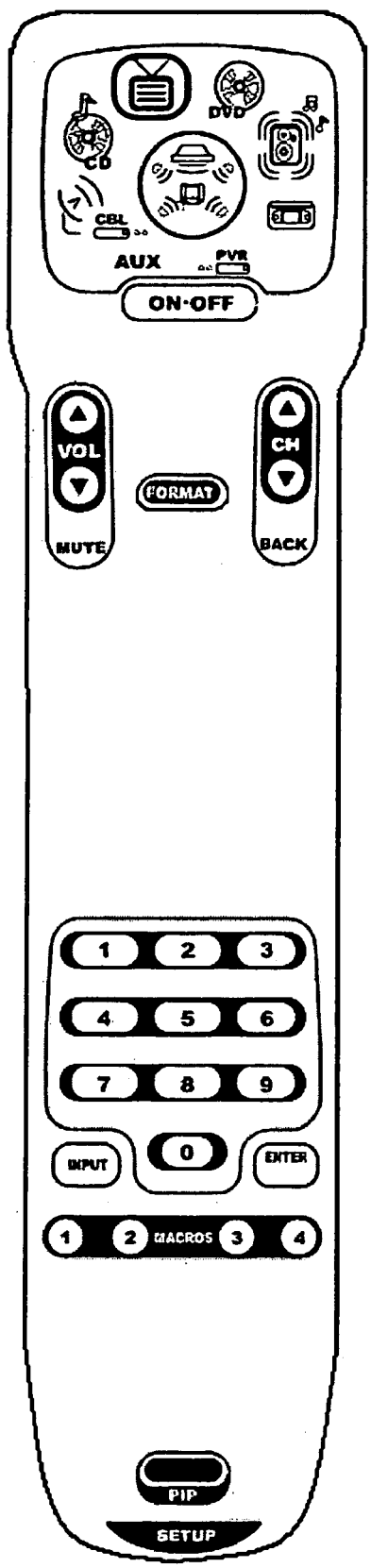
Figure 5B:
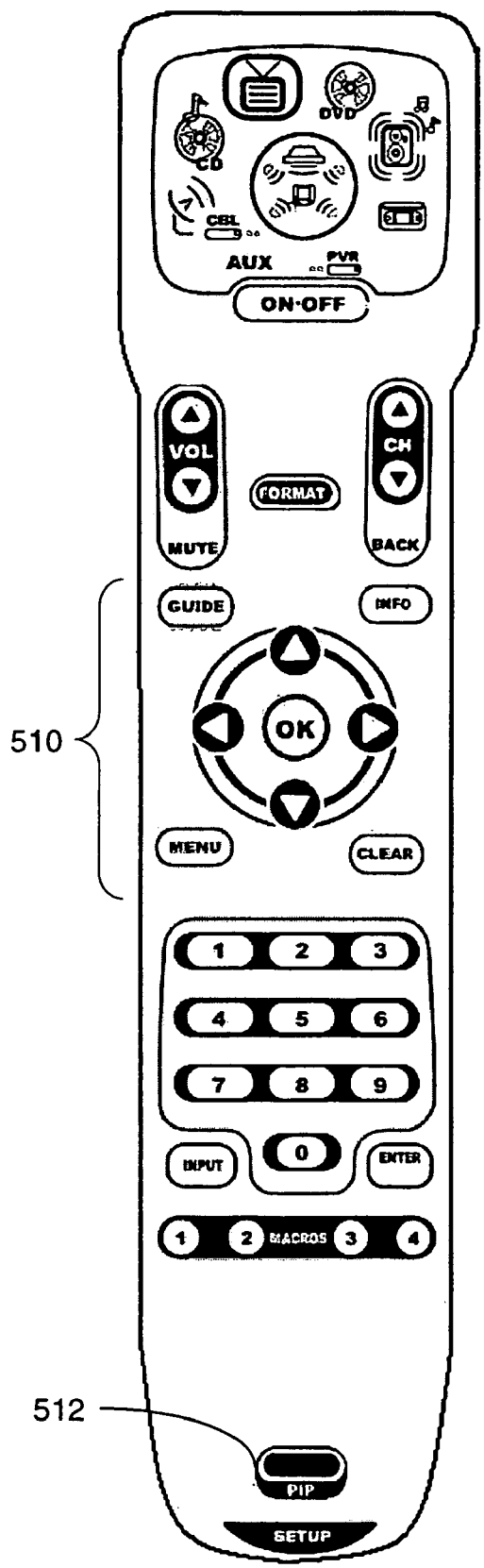
Figure 5C:
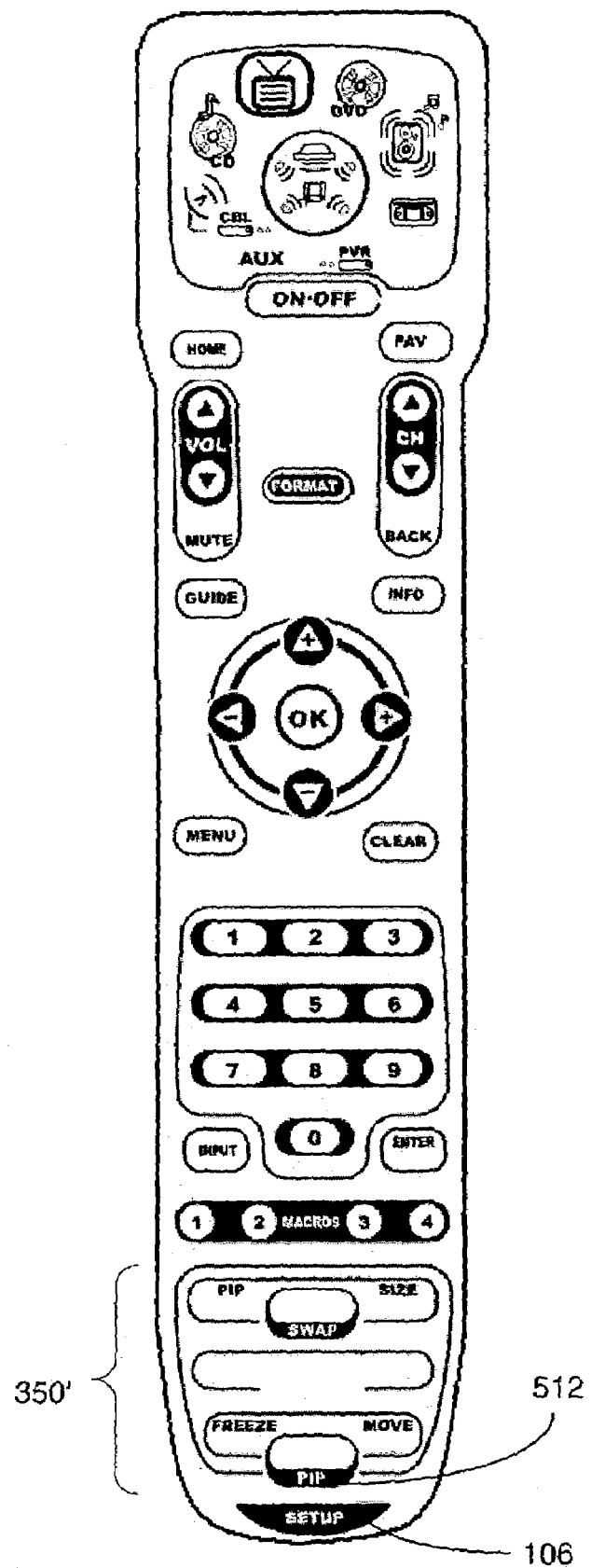

The ability to independently illuminate various parts of the display may also be used to selectively illuminate groups of function keys which correspond to functions applicable to a particular device to be controlled by the remote control 100. By way of example, FIGS. 5a and 5b illustrate how the keypad display may appear for use in controlling the operation of a television device which supports menu functionality 510 (FIG. 5b) versus the keypad display for use in controlling the operation of a television which does not support menu functionality (FIG. 5a). For additional explanation regarding the display of function keys considering functionality of a device, reference may be had to co-pending application Ser. No. 09/905,396 that is incorporated herein by reference in its entirety. The ability to independently illuminate various parts of the display may be further used to display various key functionalities according the current state of the intended target device (i.e., the device to which commands are to be transmitted). An example of this is shown in FIGS. 5b and 5c where activation of the "PIP" key 512 by the user not only transmits the remote control command to toggle the television device in and out of a picture-in-picture mode, but also controls availability (i.e., the display of function keys for activation) of the key set 350' used to control the picture-in-picture display as a function of the PIP state the television device is commanded to enter.

Figure 8:
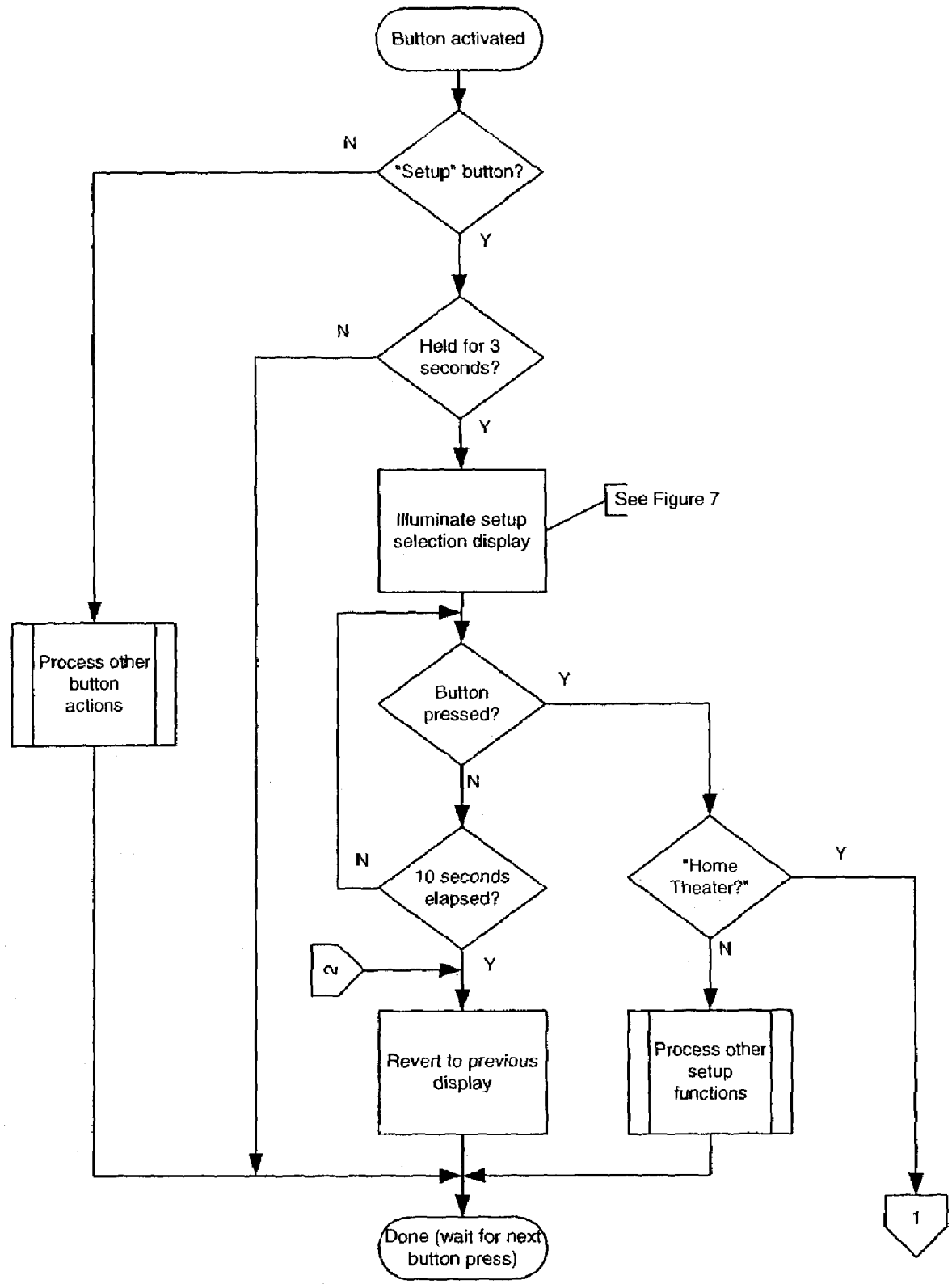
FIGS. 8 and 9 illustrate a flow chart diagram of exemplary steps for use in setting up the user interface of the remote control of FIG. 1.

Yet another manner in which the ability to independently illuminate various parts of the display may be used is to simplify setup of remote control features. For example, if the exemplary remote control 100 includes a "home theater" mode as described earlier, for example, activated by a special device selection key 108 as illustrated in FIG. 1, the setup of this home theater mode of operation may be made through use of selective illumination. Such an exemplary setup process is illustrated in the flowchart of FIG. 8. In the illustrated example, to initiate a setup mode the user may press and hold a setup key 106, illustrated by way of example in FIG. 7, for a predetermine time period, e.g., three seconds. Activation of the setup key in this manner may then cause the display of a setup menu 340", illustrated by way of example FIG. 7. From the choices presented in the setup menu, the user may select the home theater setup button 716 to enter a mode for setting up the home theater graphical user interface page.

Figure 9:
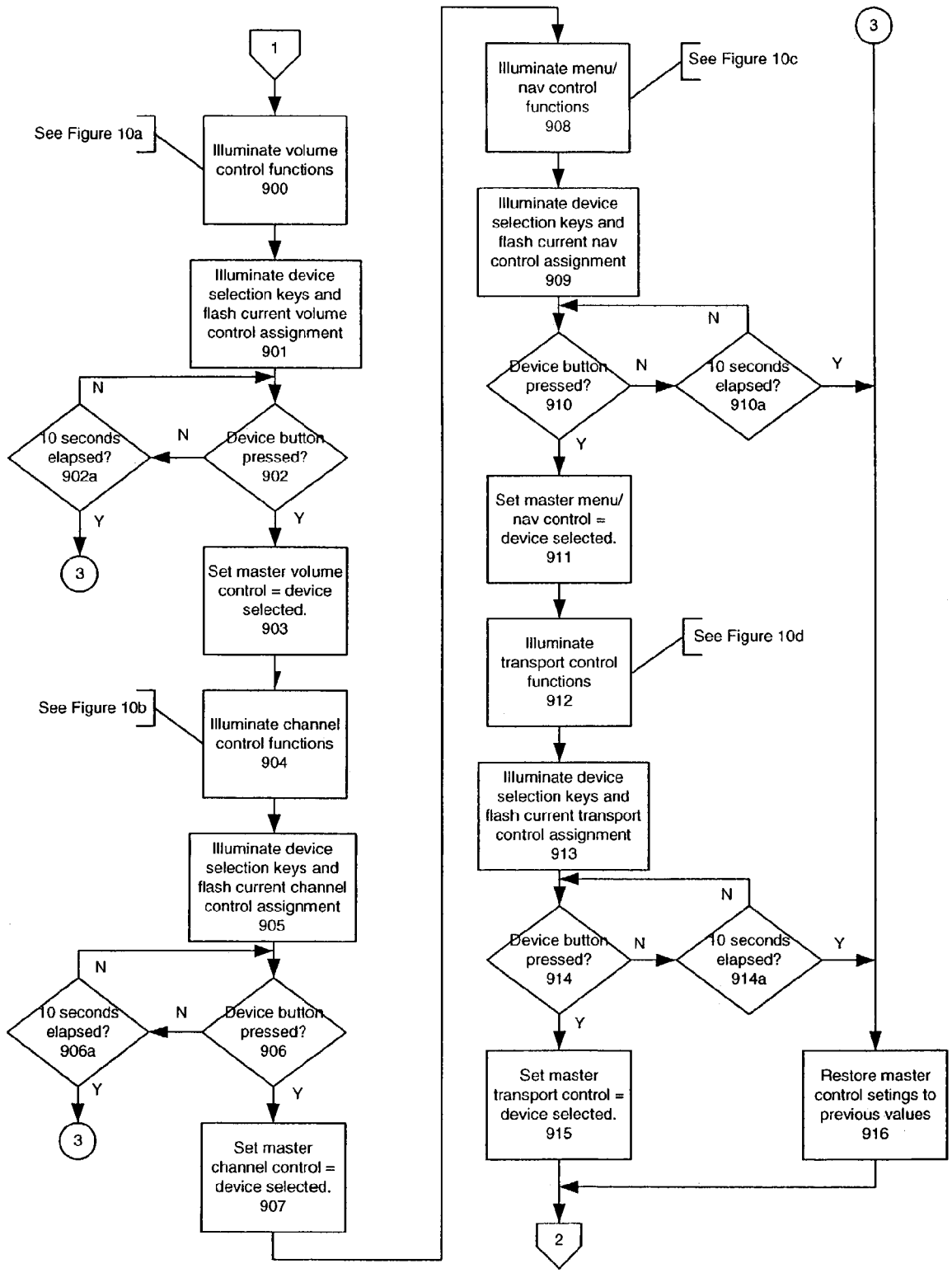
Figures 10A, 10B:
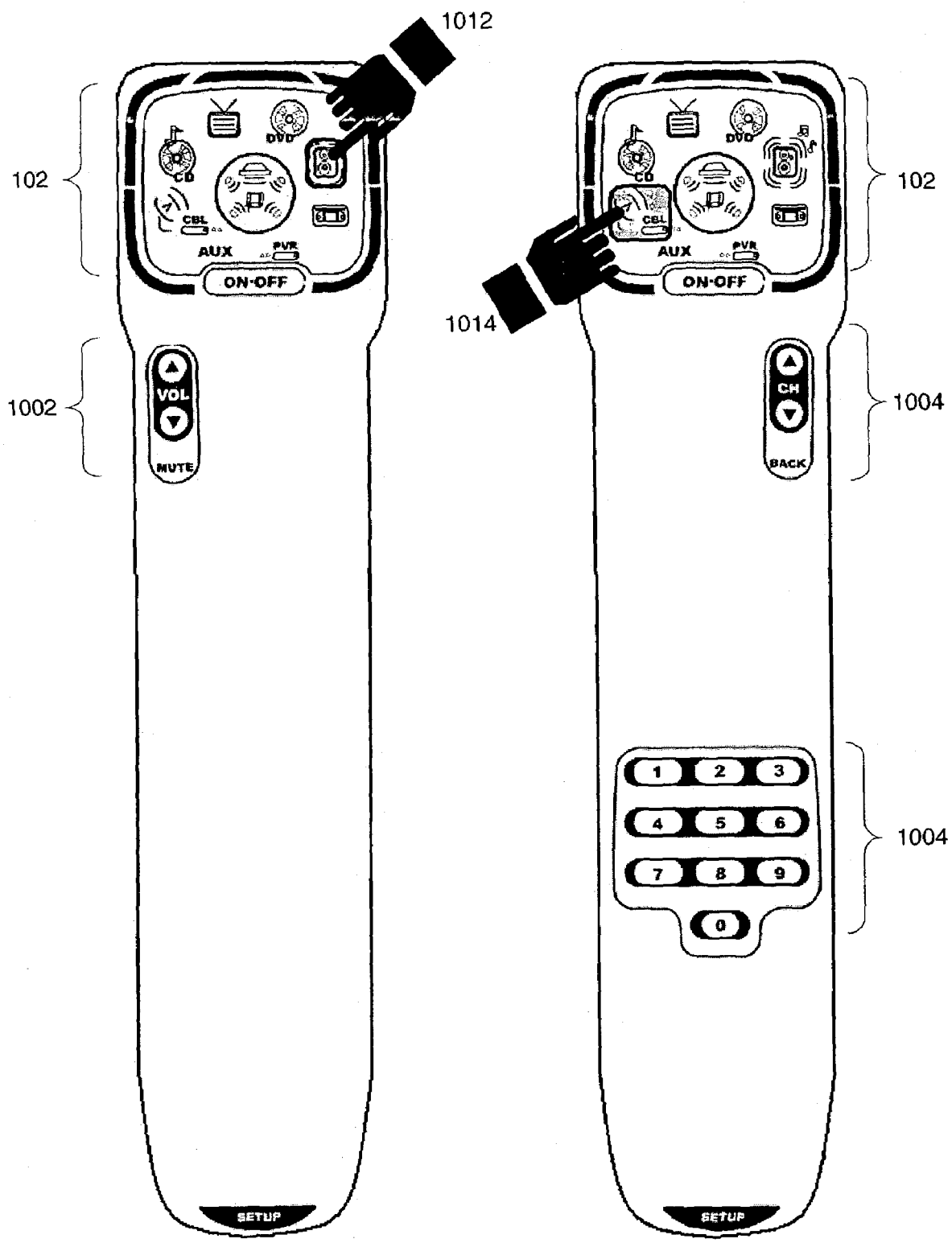
FIG. 10 illustrates exemplary, local, screen-guided setup displays for use in setting up the user interface of the remote control of FIG. 1.
Figures 10C, 10D:
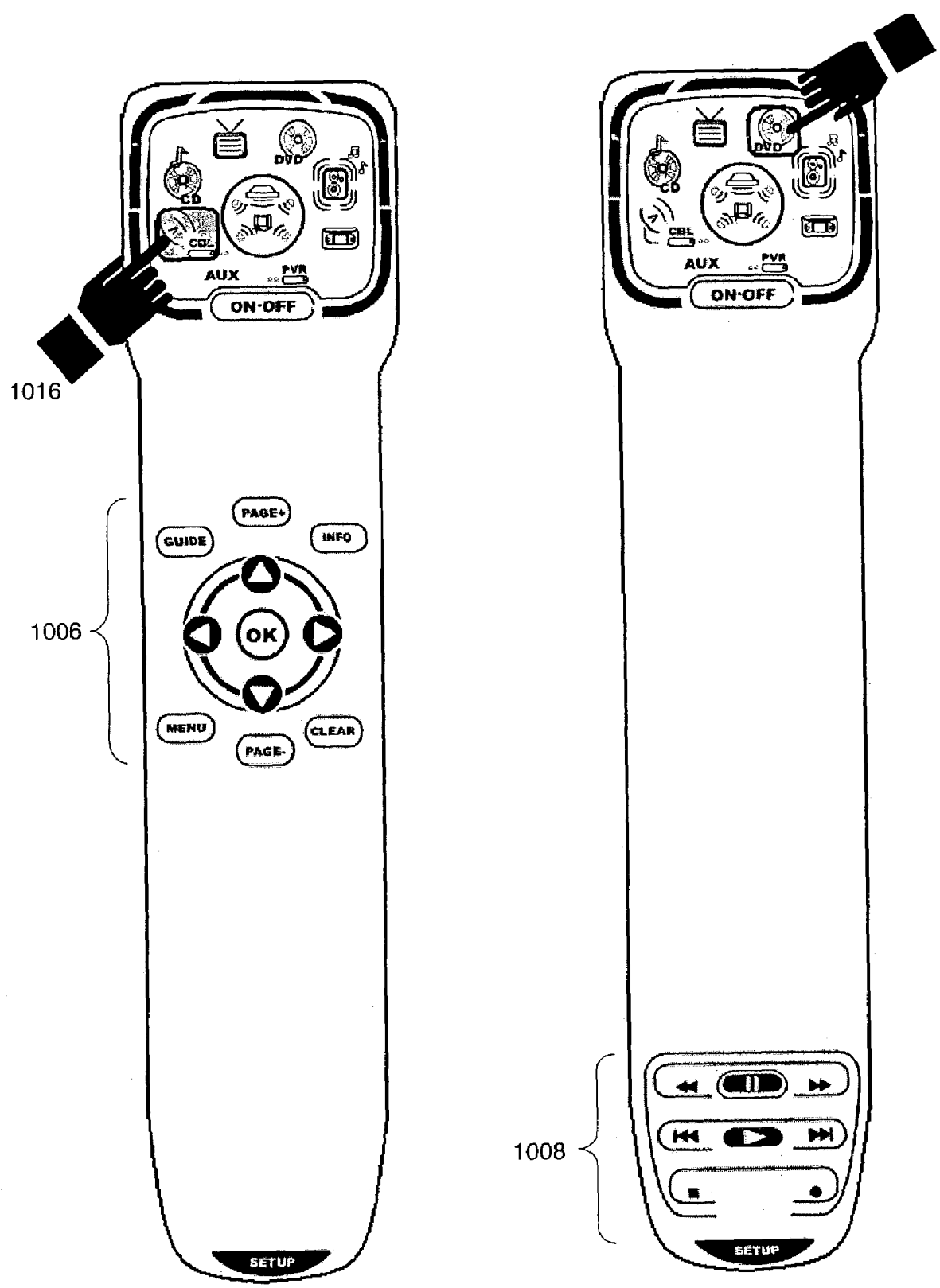
Figure 11:
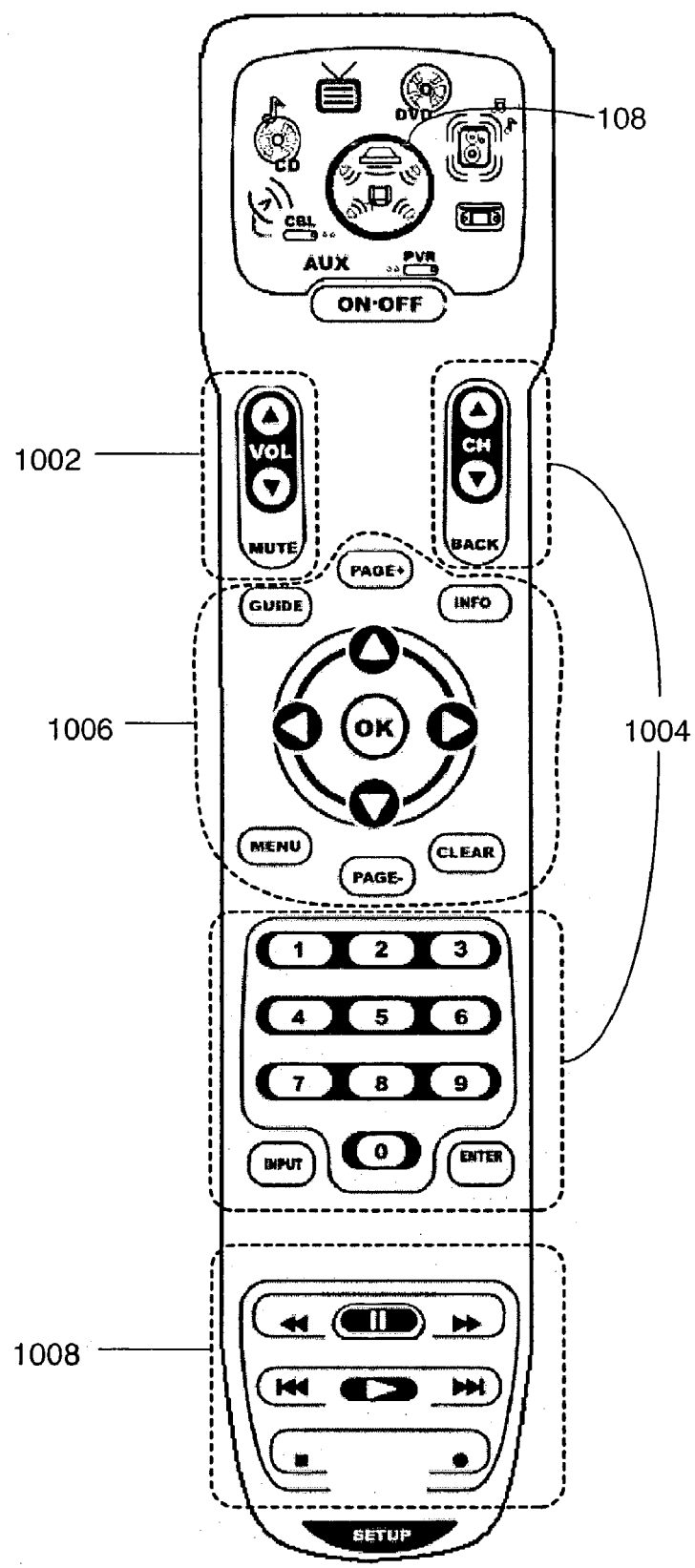
FIG. 11 illustrates an exemplary user interface resulting from the steps performed in accordance with FIGS. 8–10.
Figure 12:
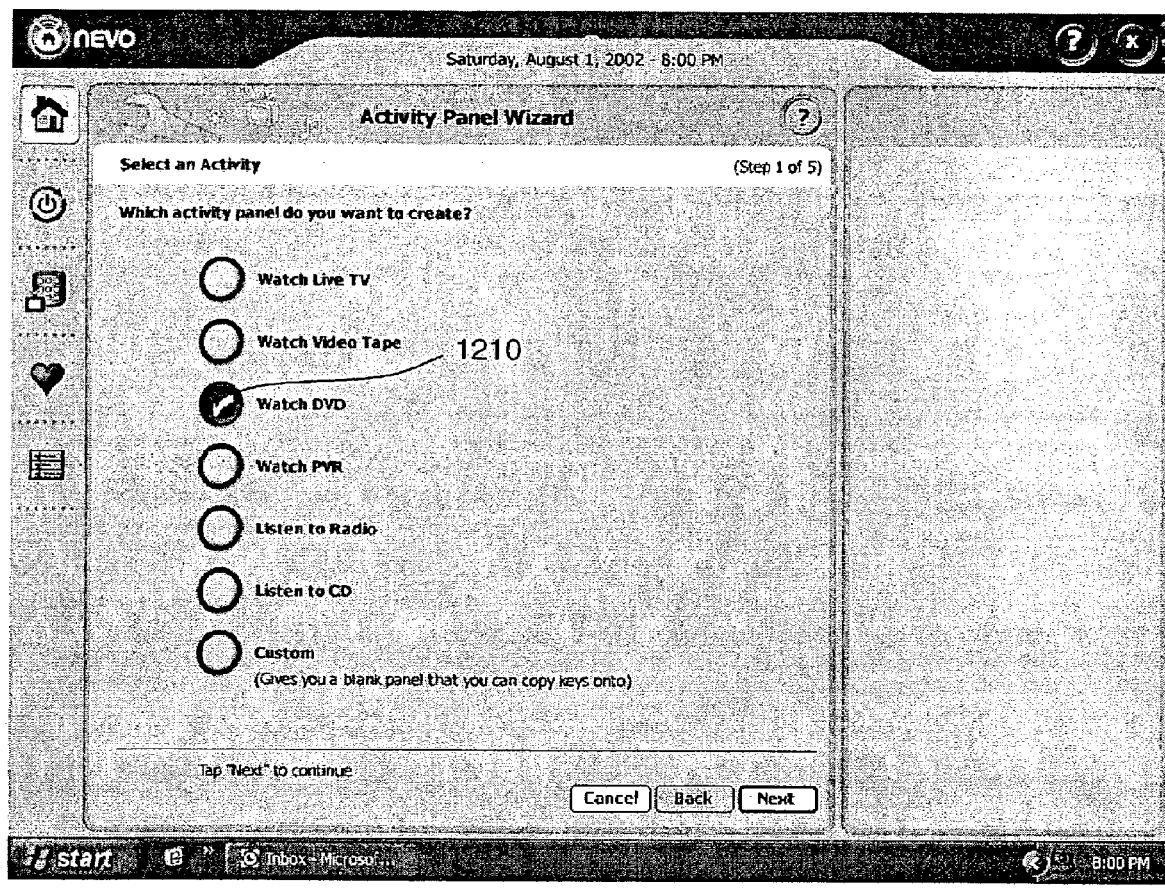
FIGS. 12–17 illustrate further, exemplary, local, screen-guided setup displays for use in setting up the user interface of a remote control device.
Figure 13:
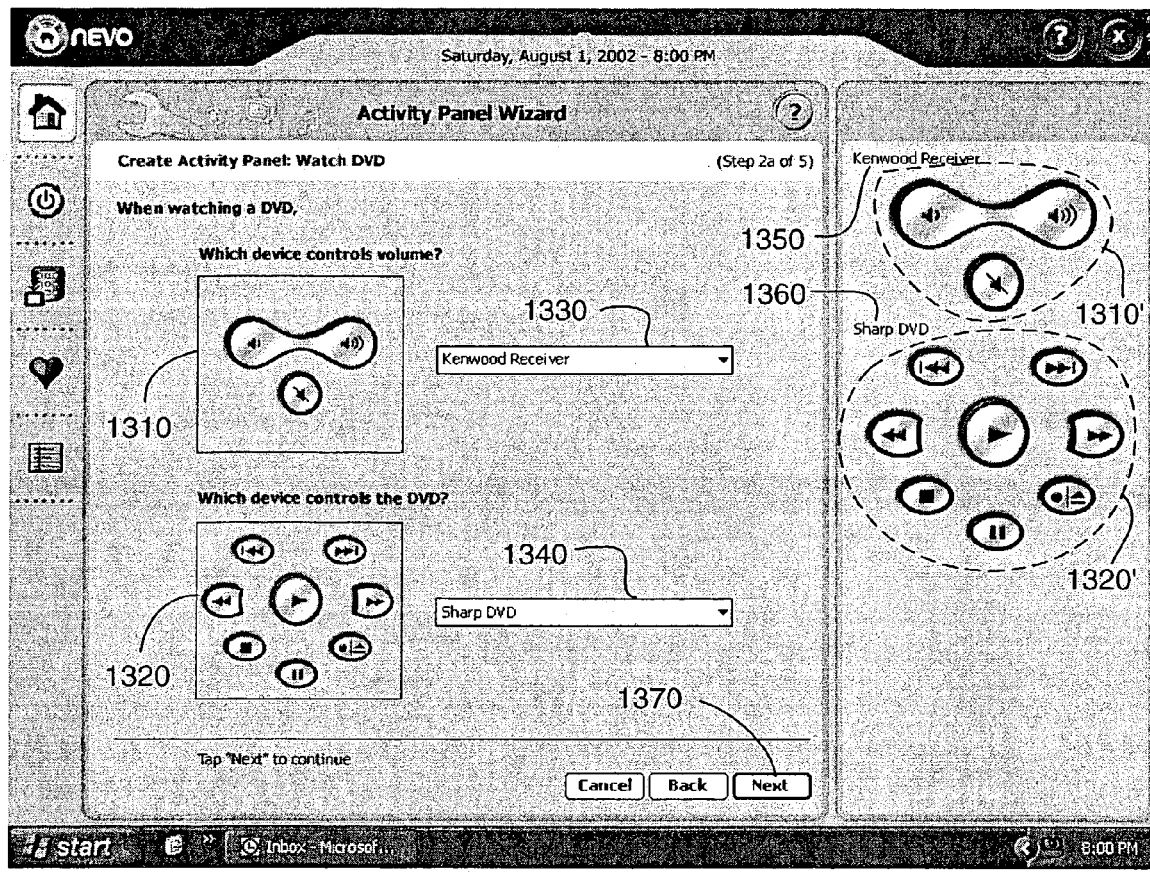

In response to selection of the home theater setup button 716, the remote control 10 may generally perform steps diagrammed in the flowchart of FIG. 9 and illustrated in FIGS. 10a through 10d. By way of example only, the steps for setting up the home theater page may comprise illuminating each group of functions to be controlled (e.g., the transport function keys, the volume function keys, the channel control function keys, etc.), one at a time, and allowing the user to select the device to which the illuminated group of function keys are to be assigned when in home theater mode. Referring to FIG. 10a and flowchart steps 900 through 903, first the keys associated with volume control 1002 may be illuminated together with the device keys 102. (The device keys 102 illuminated may be limited to only those devices for which the remote control has been setup to control the operation of—using well known setup procedures—or may allow for the display of all devices capable of being controlled and, if one is selected for which the remote control has not been setup to control, a setup procedure would be started to cure this oversight). One or both sets of buttons (function and device buttons) may be flashed several times to further indicate to the user that this attribute is ready for assignment to a specific device. Further, the current device assigned to a function group (if any) may be indicated in the device display area by flashing or animating an icon 102 representative of the device. Once the user has selected the new device to be used as, in this example, the master volume control for the home theater mode, by touching 1012 the icon representing the desired target device for the volume commands (the audio amplifier in the example shown), the process may be repeated to setup (i.e., assign a target device to) the channel changing keys 1004 (FIG. 10b and flowchart steps 904 through 907), the guide navigation keys 1006 (FIG. 10c and flowchart steps 908 through 911) and finally the transport keys 1008 (FIG. 10d and flowchart steps 912 through 915). Upon completion of these steps, the home theater mode of the illustrated, exemplary remote control, illustrated in FIG. 11, would be configured as follows:

| FUNCTION KEY GROUP | TARGET APPLIANCE |
| --- | --- |
| Volume control buttons 1002: | Audio amplifier |
| Channel changing 1004: | Satellite receiver |
| Menu navigation 1006: | Satellite receiver |
| Transport control 1008: | DVD player. |

It will be appreciated that similar approaches may be used to simplify other aspects of configuring the remote control 100. For example, configuration of the "volume lock" feature (button 718 in FIG. 7), which allows assignment of a master volume control device across all modes, may be accomplished in a manner similar to that described above in conjunction with FIG. 10a.

FIGS. 12 through 17 illustrate alternative steps for setting up the user interface of a remote control application. In this example, the remote control application is implemented on a PDA, tablet PC, or Smart Display platform as contemplated in co-pending U.S. application Ser. Nos. 10/288,727 and 10/176,315 which are incorporated herein by reference in their entirety. With these platforms, a portion of the screen may be set aside for a composite set of function control keys 1700 that would be associated with a home theater mode of operation and/or a particular activity such as watching a DVD movie, shown for example in FIG. 17. Exemplary steps involved in configuring this set of function keys is shown in FIGS. 12 through 16.

Figure 14:
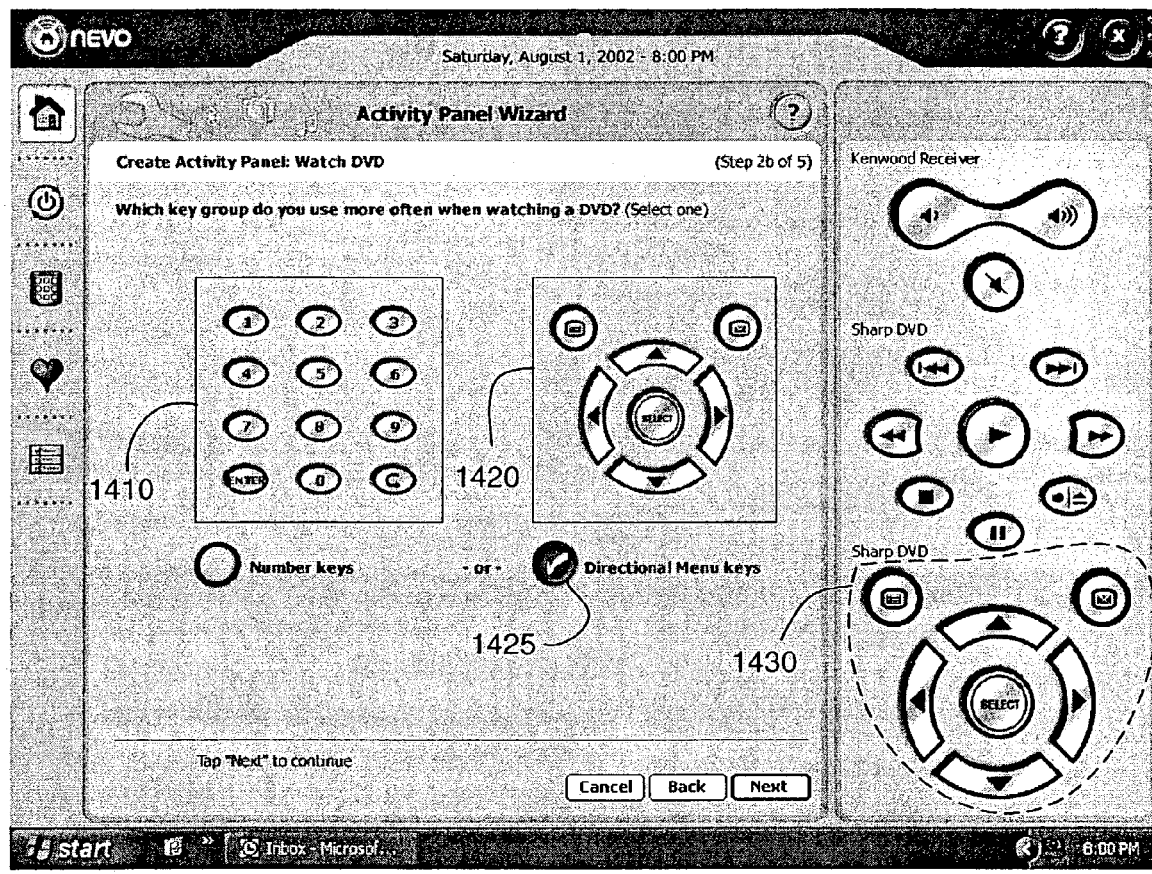
Figure 15:
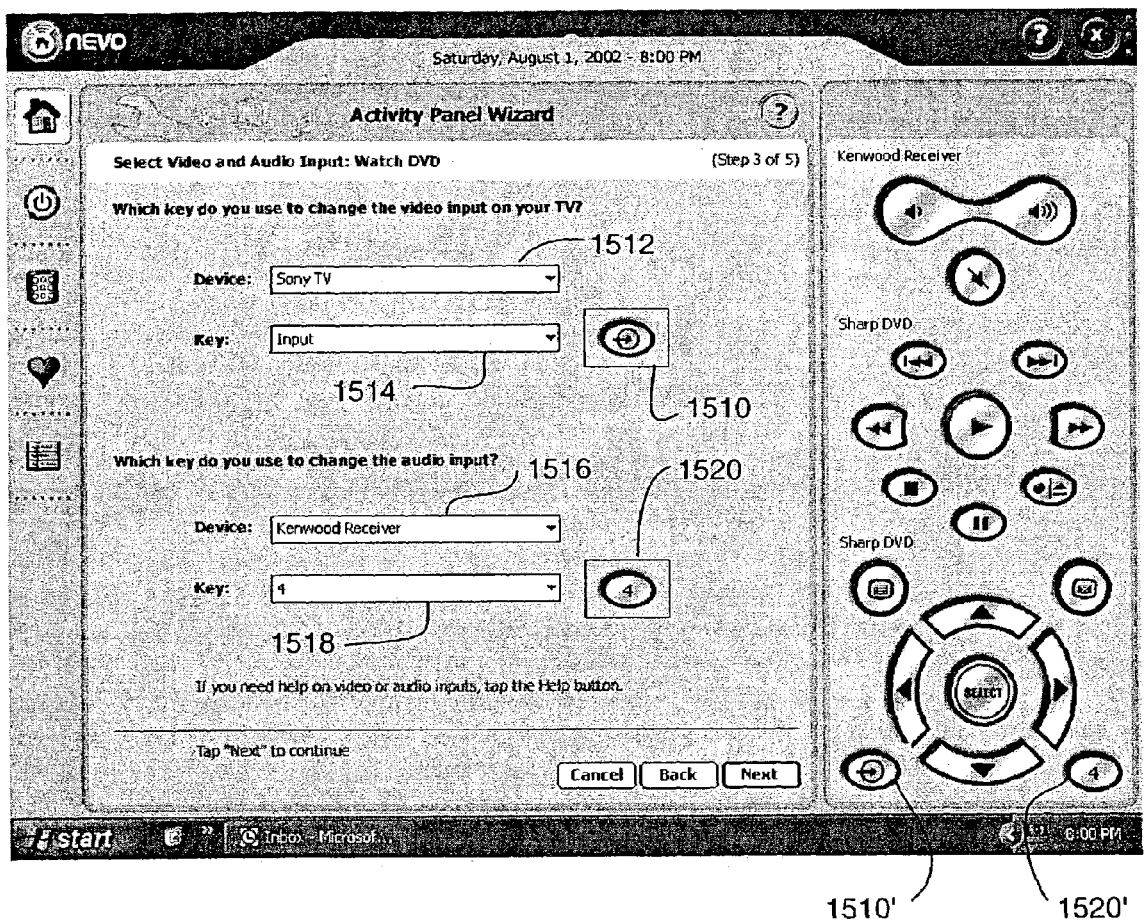
Figure 16:
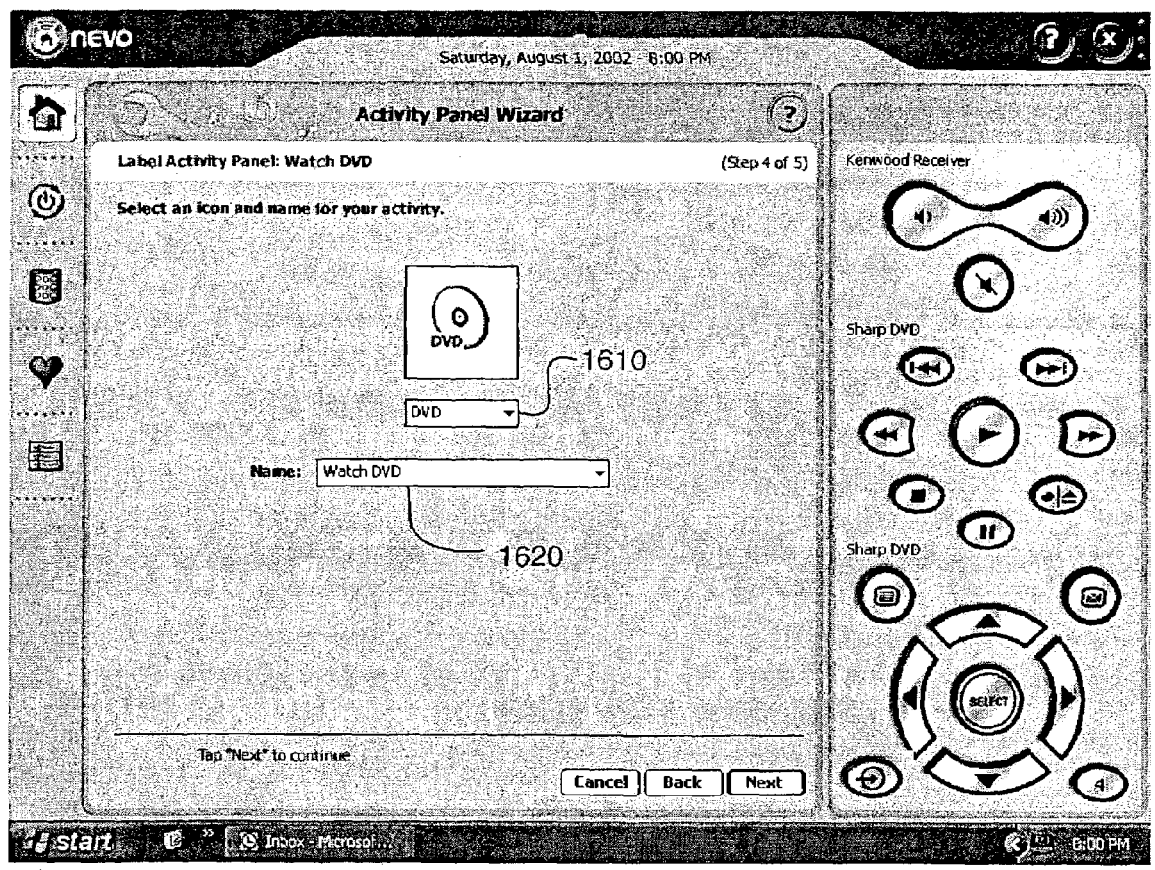
Figure 17:
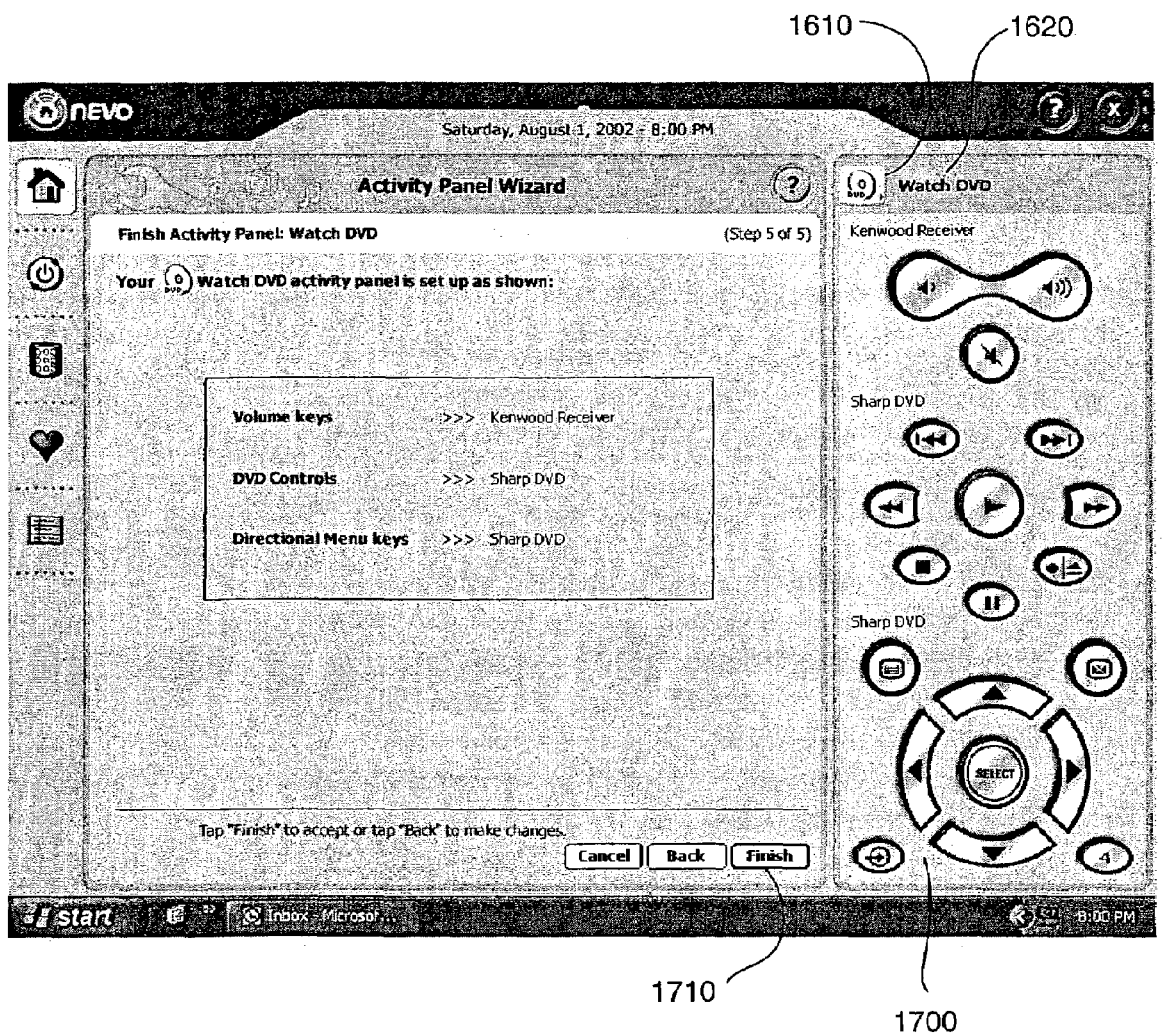

In the illustrated example, the user may first select the home theater mode and/or activity for which the user wishes to create a set of function keys, watching DVD 1210 is the selected function in the example illustrated. In response, the application may display (FIG. 13) function key groups 1310, 1320 together with drop-down menus 1330, 1340 from which a target device to be assigned to each function key group may be selected. In addition, the setup process may also indicate locations 1310' and 1320' in which these key groups may be placed in the resulting composite function key user interface page or field, together with a label of the like showing the current settings for each group 1350, 1360 (if any). Once the user has assigned a target device to a function key group and is satisfied with the device assignments for these keys, tapping the "next" icon 1370, for example, may step the user to a further setup screen, shown by way of example in FIG. 14. The example page illustrated in FIG. 14 presents the user with different function key groups 1410, 1420 and requests the user to indicate which one is used most frequently during the activity specified. In the illustrated example, the user has selected 1425, indicative of the directional menu navigation keys 1430, to be included in the composite key set. Preferably, the function key groups 1410 and 1420 include functions that are supported by the intended target appliance. FIG. 15 illustrates how individual keys 1510, 1520 may also be placed in the home theater or activity page and configured to perform specific functions through the use of device and function key command pull-down menus 1512, 1514, 1516 and 1518. In the example illustrated in FIG. 16, the user selects an icon 1610 and name 1620 for the activity panel just created. Selection of this icon from, for example a home page, would cause the display of the created activity panel. FIG. 17 shows the completed composite set of command keys. Tapping "finish" 1710 in this example would be used to indicate a completion to this screen-guided setup process.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalents thereof.

What is claimed is:

1. A method for setting up a user interface of a remote control comprised of a plurality of function keys, comprising:
   causing at least one function key from the plurality of function keys to be presented such that a first logical group of functions keys that includes the at least one function key is emphasized relative to the remaining plurality of function keys wherein function keys within the first logical group of function keys are activatable to cause the remote control to transmit a command to a target device; and
   accepting in the remote control user input that functions to assign a device as the target device for the first logical group of function keys.

2. The method as recited in claim 1, comprising causing at least one function key from the plurality of functions keys to be presented such that a second logical group of function keys that includes the at least one function key is emphasized relative to the remaining plurality of function keys wherein function keys within the second logical group of function keys are activatable to cause the remote control to transmit a command to a target device and accepting in the remote control user input that functions to assign a device as the target device for the second logical group of function keys.

3. The method as recited in claim 2, wherein the first and second logical group of function keys are each selected from a group consisting of channel function keys, volume function keys, and transport function keys.

4. The method as recited in claim 1, wherein the first logical group of function keys is emphasized by selectively illuminating portions of the remote control that are associated with the at least one functions key that is included within the first logical group of function keys.

5. The method as recited in claim 4, comprising blinking the selectively illuminated portions of the remote control.

6. The method as recited in claim 4, wherein the selectively illuminated portions of the remote control comprise segments of an electroluminescent display.

7. The method as recited in 1, wherein the remote control comprises a plurality of indicators representative of a device and wherein a selection of one of the plurality of indicators functions to assign the device as the target device for the first logical group of function keys.

8. The method as recited in claim 7, comprising displaying the plurality of indicators representative of a device within a menu.

9. The method as recited in claim 7, wherein the plurality of indicators representative of a device is limited to devices for which the remote control has been setup to control.

10. The method as recited in claim 7, comprising selectively illuminating portions of the remote control associated with the plurality of indicators representative of a device.

11. The method as recited in claim 10, comprising blinking the selectively illuminated portions of the remote control.

12. The method as recited in claim 10, wherein the selectively illuminated portions of the remote control comprise segments of an electroluminescent display.

13. The method as recited in claim 1, wherein the first logical group of function keys is emphasized by selectively displaying an image of the at least one functions key that is included within the first logical group of function keys.

14. The method as recited in claim 13, comprising accepting user input for indicating an area on a display of the remote control in which the at least one function key within the first logical group of function keys is to be displayed.

15. A readable medium having instructions for setting up a user interface of the remote control comprised of a plurality of function keys, the instructions performing steps comprising:
   causing at least one function key from the plurality of function keys to be presented such that a first logical group of functions keys that includes the at least one function key is emphasized relative to the remaining plurality of function keys wherein function keys within the first logical group of function keys the activation of which will are activatable to cause the remote control to transmit a command to a target device; and
   accepting in the remote control user input that functions to assign a device as the target device for the first logical group of function keys.

16. The readable medium as recited in claim 15, wherein the instructions provide for causing at least one function key from the plurality of function keys to be presented such that a second logical group of function keys that includes the at least one function key is emphasized relative to the remaining plurality of function keys wherein function keys within the second logical group of function keys are activatable to cause the remote control to transmit a command to a target device and accepting in the remote control user input that functions to assign a device as the target device for the second logical group of function keys.

17. The readable medium as recited in claim 16, wherein the first and second logical group of function keys are each selected from a group consisting of channel function keys, volume function keys, and transport function keys.

18. The readable medium as recited in claim 15, wherein the first logical group of function keys is emphasized by selectively illuminating portions of the remote control that are associated with the at least one functions key within the first logical group of function keys.

19. The readable medium as recited in claim 18, wherein the instructions provide for blinking the selectively illuminated portions of the remote control.

20. The readable medium as recited in claim 18, wherein the selectively illuminated portions of the remote control comprise segments of an electroluminescent display.

21. The readable medium as recited in 15, wherein the remote control comprises a plurality of indicators representative of a device and selection of one of the plurality of indicators functions to assign the device as the target device for the first logical group of function keys.

22. The readable media as recited in claim 21, comprising selectively illuminating portions of the remote control associated with the plurality of indicators representative of a device.

23. The readable medium as recited in claim 22, wherein the instructions provide for blinking the selectively illuminated portions of the remote control.

24. The readable medium as recited in claim 22, wherein the selectively illuminated portions of the remote control comprise segments of an electroluminescent display.

25. The readable media as recited in claim 21, wherein the instructions provide for displaying the plurality of indicators representative of a device within a menu.

26. The readable media as recited in claim 21, wherein the plurality of indicators representative of a device is limited to devices for which the remote control has been setup to control.

27. The readable media as recited in claim 15, wherein the first logical group of function keys is emphasized by selectively displaying an image of the at least one functions key that is included within the first logical group of function keys.

28. The readable media as recited in claim 27, wherein the instructions provide for accepting user input for indicating an area on a display of the remote control in which the at least one function key within the first logical group of function keys is to be displayed.

* * * * *